Feb. 28, 1956 W. J. VEDDER 2,736,258
BOTTLE CLOSURE TRANSFER AND PRINTING MEANS
Filed Feb. 14, 1952 4 Sheets-Sheet 1

*INVENTOR.*
WILLIAM J. VEDDER
BY *Bodell & Thompson*

Attorneys

Feb. 28, 1956  W. J. VEDDER  2,736,258
BOTTLE CLOSURE TRANSFER AND PRINTING MEANS
Filed Feb. 14, 1952  4 Sheets-Sheet 2

INVENTOR.
WILLIAM J. VEDDER
BY Bodell & Thompson
Attorneys

Feb. 28, 1956 W. J. VEDDER 2,736,258
BOTTLE CLOSURE TRANSFER AND PRINTING MEANS
Filed Feb. 14, 1952 4 Sheets-Sheet 3
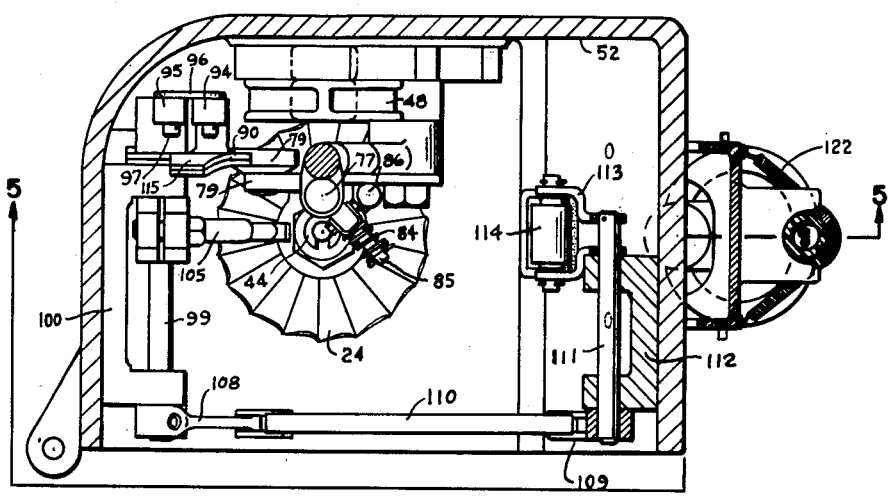
FIG. 4
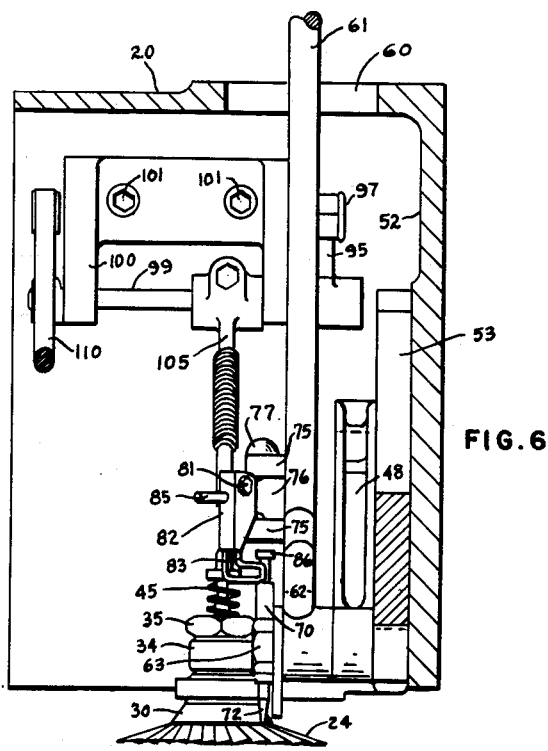
FIG. 6
FIG. 9
INVENTOR.
WILLIAM J. VEDDER
BY Bodell & Thompson
Attorneys Feb. 28, 1956 W. J. VEDDER 2,736,258
BOTTLE CLOSURE TRANSFER AND PRINTING MEANS
Filed Feb. 14, 1952 4 Sheets-Sheet 4

INVENTOR.
WILLIAM J. VEDDER
BY Bodell & Thompson
Attorneys

United States Patent Office 2,736,258
Patented Feb. 28, 1956

2,736,258

BOTTLE CLOSURE TRANSFER AND PRINTING MEANS

William J. Vedder, Flushing, N. Y., assignor to Oswego Falls Corporation, Fulton, N. Y., a corporation of New York Application February 14, 1952, Serial No. 271,571

4 Claims. (Cl. 101—35)

This invention relates to apparatus for transferring bottle caps or closures. Such apparatus is used in bottle capping machines, such as machines for applying paper caps to milk bottles, an example of which is disclosed in Patent No. 2,310,868, to J. F. Price, February 9, 1943. The apparatus functions automatically and in timed relation to the operation of the capping machine to withdraw closures from a supply and release the closures at a discharge point for application to the bottle tops. The caps or closures are usually arranged in stack formation in a tubular magazine with the closures inverted—that is, the top side of the closures, as they are affixed on the bottles, is facing downwardly.

When the closures are formed of paper, metal foil, or other sheet material, the closure engaging member is usually in the form of a rubber suction cup which is mounted to be moved over a path between the closure discharge point and the supply magazine. Vacuum is supplied to the suction cup upon its engagement with the lowermost cap in the supply magazine, whereby the cap becomes secured to the suction cup for transfer of the cap, the vacuum being disconnected at the discharge point to permit the cap to be released. Where the caps are arranged in the tubular magazine in inverted form, the suction cup is moved during its travel to the discharge point to position the cap right side up at the time it is released for application to the bottle.

The specific formation of some caps permit, or require, the use of a transfer member other than the suction cup type. For example, the transfer member may be provided with pins, or sharp projections, to engage the cap for withdrawal from the magazine and transfer to the discharge point.

In many jurisdictions, it is required that packages containing certain food products, such as milk, bear a notation of the day or date when the product was packaged. This requirement has necessitated the dairies keeping separate stocks of caps for each day of the week and, of course, to supply the magazine with caps printed to indicate the proper day or date. This places a substantial burden on the dairies and often the machine operators neglect to use caps properly printed for the day.

Attempts have been made to print the day or date on the bottle cap just prior to its application to the bottle top. However, such devices have not been satisfactory especially in that they have required engagement with both sides of the caps. This is objectionable because it presents the possibility of contamination of the under side of the cap which is next to the contents of the bottle.

This invention has as an object a bottle closure transfer embodying a novel structure for impressing, or printing, the day or date, or a symbol indicative thereof, on each closure as the same is transferred from the supply magazine to a point for application to the bottle tops, the impressing or printing being done by engaging the upper or outside surface of the closure only.

The invention has as a further object a closure transfer of the type referred to embodying a structural arrangement whereby the die, type, or printing element, can be quickly and conveniently changed.

The invention has as a further object a closure transfer of the type referred to embodying an arrangement to coat the printing element with ink once only for the transfer of each closure.

The invention has as a further object a closure transfer of the vacuum cup type embodying a printing die positioned so that upon the application of vacuum to the suction cup, the closure is moved into engagement with the printing die.

The invention consists in the novel features and in the combinations and constructions hereinafter set forth and claimed.

In describing this invention, reference is had to the accompanying drawings in which like characters designate corresponding parts in all the views.

In the drawings—

Figure 4 is a view taken on line 4—4, Figure 1.

Figure 6 is a view taken on line 6—6, Figure 1.

Figure 9 is a view taken on line 9—9, Figure 2.

Figure 1:
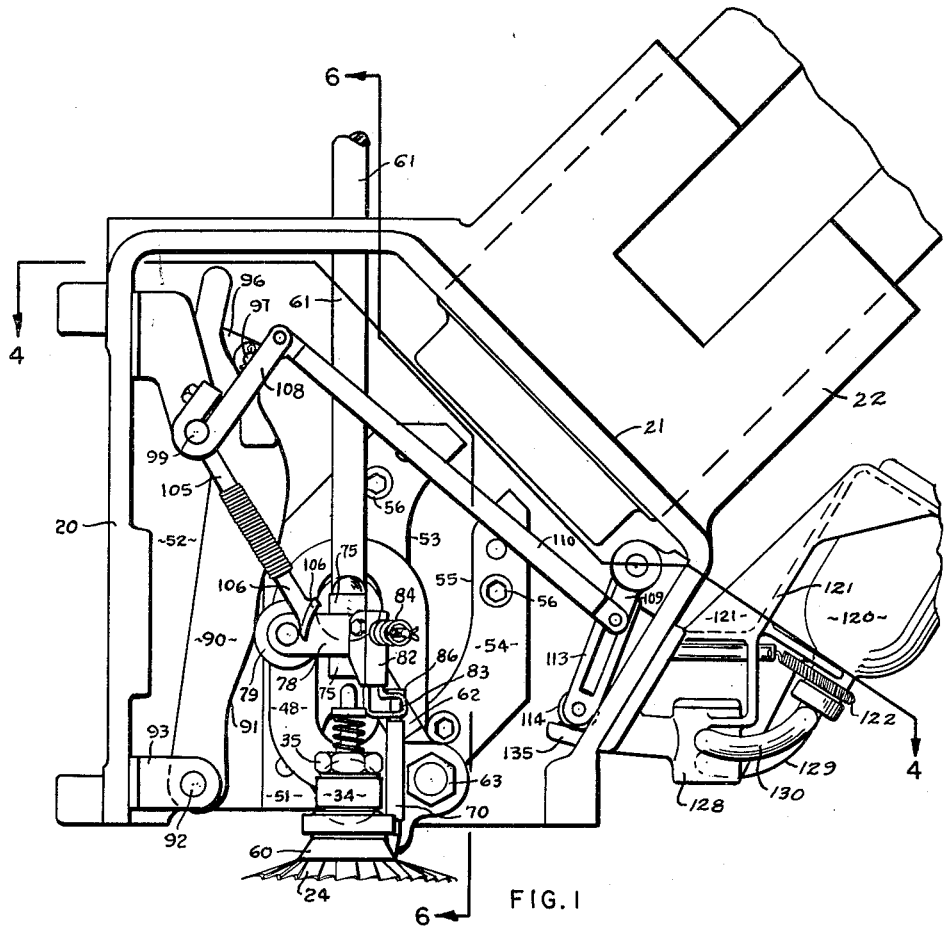
Figure 1 is a side elevational view of a closure transfer embodying my invention showing a closure transferred from the supply and about to be released.

The closure transfer illustrated in the drawings is of the type employing a suction or vacuum cup for the closure engaging member, the closure being in the form of a paper disk applied to the tops of milk bottles by a machine, such as that disclosed in the Price Patent No. 2,310,868. The paper closures are partially pre-formed so that they are somewhat dished—that is, they have a substantially flat discoidal central portion and an annular portion extending outwardly from the discoidal portion in angular relation thereto. The transfer mechanism is mounted in a box shaped housing 20 attached to the capping machine. One side of the housing 20 is inclined, as at 21, and is provided with a relatively large boss 22 bored to receive the lower end portion of a tubular magazine 23 in which a supply of closures 24 is arranged in stack formation. The boss 22 is provided with a screw 26 engaging a laterally extending projection 28 on the magazine and provides a means for accurately positioning the bottom end of the magazine.

The suction cup 30 is formed of resilient or yieldable material, such as rubber, and is mounted on a tubular member 31, the cup being positioned against a shoulder portion 32 by an arm 33 apertured to receive the tubular member and engaged by a collar 34 which, in turn, is engaged by a nut 35 threaded upon the tubular member 31, whereby the assembly of the suction cup 30, the arm 33, and collar 34, are clamped together as a unit. The collar 34 is formed on its inner surface with an annular groove 36 connected to a source of vacuum through a flexible conduit 37. The tubular member 31 is formed with radial apertures 38 communicating with radial extending slots 39 formed in the shoulder portion 32, and in which there is slidably mounted in the tubular member 31 a stem 42 provided at one end with a printing die 43, see Figure 8, the stem 42 projecting outwardly beyond the opposite end of the tubular member 31 and being provided with a removable collar 44. A coil compression spring 45 is interposed between the nut 35 and the removable collar 44, whereby the type or die 43 is positioned in the bottom of the suction cup 30 in the center thereof, see Figures 7 and 8.

The arm or bracket 33 is fixedly secured to, or formed integral with, an elliptical shaped member 48 provided with an elongated bore or slot 49 to receive a pin 50 fixedly secured to and projecting outwardly from a block 51 attached to the inner back wall 52 of the housing 20. The block 51 is formed along one edge with an irregular curved surface 53. A second block 54 is attached to the wall 52 of the housing in spaced relation to the block 51 and the edge of the block 54 confronting the edge 53 of block 51 is formed with a complemental curved surface 55. The blocks 51, 54, are secured to the back wall 52 of the housing, as by screws 56 and dowel pins 57.

The curved edges 53, 55, of the blocks 51, 54, form a cam groove in which a roller 58 travels. The roller 58 is journalled on a pin 59, see Figure 8, projecting rearwardly from the member 48.

The top wall of the housing 20 is formed with a slot 60, see Figure 6, through which a connecting rod 61 extends. The lower end portion 62 of the connecting rod extends in angular relation to the upper portion of the rod and is pivotally connected to the member 48 by a screw 63.

Figure 2:
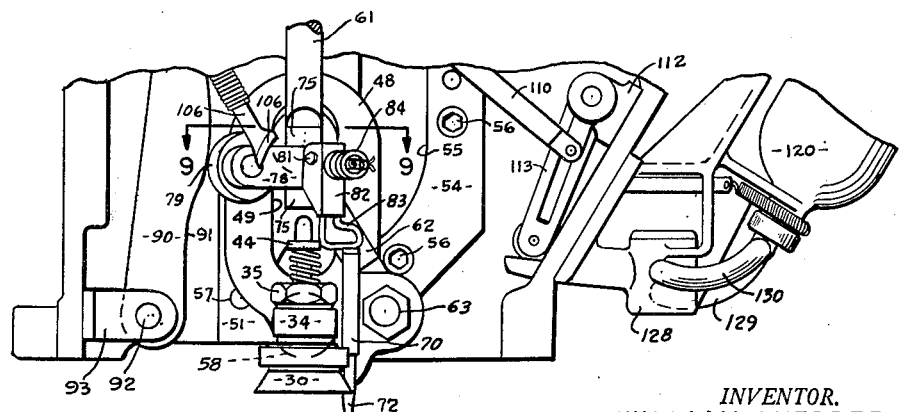
Figure 2 is a view corresponding to the lower portion of the structure shown in Figure 1, illustrating the transfer member positioned at the discharge point with no closure having been transferred from the supply during the previous cycle of movement of the transfer member.
Figure 5:
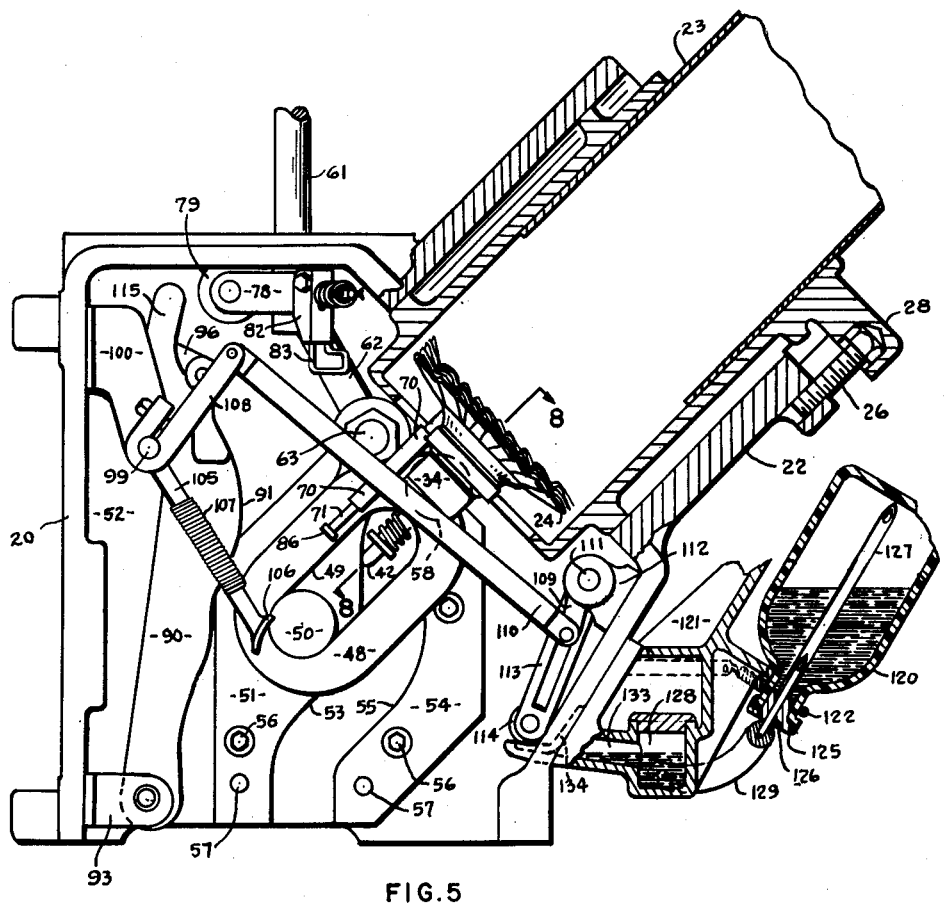
Figure 5 is a view taken on line 5—5, Figure 4.

The connecting rod 61 is attached at its upper end to a crank or similar member to impart vertical reciprocation to the rod. This vertical reciprocation is thus imparted to one end of the member 48 and because of the sliding connection with the fixed pin 50 and the movement of the roller 58 in the cam groove between the blocks 51, 54, the suction cup 30 is arranged in substantially horizontal position at the discharge point, or at the bottom of the down stroke of the connecting rod, as illustrated in Figures 1, 2 and 6. At the end of the upward stroke of the connecting rod, the member 48 extends generally at an angle of about 45° and coaxially with the closure magazine 23, as illustrated in Figure 5. The closures 24 are stacked in the magazine 23 in inverted position—that is, the outer surface of the closures is arranged downwardly. Accordingly, the closures have to be inverted to be properly applied to the tops of the bottles. As illustrated in Figures 1 and 6, the closures 24 are positioned right side up for release for application to the bottles. It will be understood that the connecting rod 61 is reciprocated in timed relation with the cap applying machine to which the cap transfer mechanism is associated and likewise, vacuum is applied through the conduit 37 when the vacuum cup 30 is moved in the up position, Figure 5, into engagement with the lowermost closure 24 in the magazine, the vacuum being maintained on the downward movement of the closure transfer, and the vacuum source is disconnected at the bottom of the downward movement of the transfer for the release of the closure from the cup.

When the vacuum cup 30 is moved upwardly into engagement with a closure in the magazine, the application of the vacuum causes the central discoidal portion of the closure to be drawn against the printing type 43, and the outer or top surface of the closure is thus printed with the day of the week, or with other indicia.

A tubular member 70 is attached to the member 48 with its axis extending parallel to the stem 42 and there is slidably mounted in this tubular member a pin 71, the lower end 72 of which is arranged to be engaged by a closure engaged by the suction cup 30, this causing the pin to move in the tubular member 70.

In proximity to the juncture between the connecting rod 61 and the lower angular end portion 62 thereof, there are attached to the connecting rod a pair of laterally extending projections 75, see Figures 6 and 9. A member 76 is positioned between the projections 75 and is mounted for pivotal movement on a pin 77. The member 76 is formed with an arm 78, on the end of which is journalled a roller 79, and the member 76 is formed with a second arm 80 to which there is pivotally mounted, as by a screw 81, a U shaped boxlike member 82, and this member 82 has depending from it a loop 83 extending inwardly, or toward the rear wall 52 of the housing. The U shaped member 82 is urged toward the pin 77 by a compression spring 84 mounted on a pin 85 projecting through the member 82 from the member 76. This arrangement is such that when the pin 71 is moved in a direction from the cup 30 by the cup engaging the lowermost closure in the magazine, and the pin is maintained in that position by the closure, and if the closure is withdrawn from the magazine, the pin is maintained in that position and the end portion of the pin, adjacent the head 86, will move behind the loop 83. This occurs during the movement of the transfer from the position shown in Figure 5 to the position shown in Figure 6, and is brought about because of the relative movement between the member 48 and the connecting rod. Upon the pin 71 engaging the loop 83, the loop and the lower portion of the box member 82 is swung outwardly against the tension of the spring 84. The member 76 however, cannot pivot about the pin 77 because the roller 79 is positioned alongside the lever 90, as illustrated in Figure 9. When the member 48 reaches the bottom of its travel, as shown in Figure 1, the member 76 is permitted to pivot on the pin 77 to move the roller 79 in registration with the edge 91 on the lever 90, as shown in Figures 1 and 4. When the transfer has reached the bottom of its stroke, the curved cam edge of the lever 90 is such that the lever does not overlap the roller 79 and therefore, the member 76 is permitted to pivot about the pivot pin 77 to aline the periphery of the roller with the edge 91 of the lever. The lever 90 is pivoted at its lower end on a pin 92 carried by a bracket 93 attached to one side wall of the housing 20. The upper end of the lever 90 is formed with a laterally extending projection 94 pivotally connected to an arm 95 by a link 96 and pins 97. The arm 95 is attached to the inner end of a shaft 99 journalled in a U shaped bracket 100 also attached to the side wall of the housing, as by screws 101. The cam edge 91 of the lever 90 is so formed that as the connecting rod and the member 48 move upwardly, the roller 79 causes the upper end of the lever to move to the left, Figures 1 and 3. This effects a counter-clockwise movement of the shaft 99, Figure 1.

There is attached to the shaft 99, intermediate the legs of the bracket 100, an arm 105 extending in the general direction of the pin 50 and being provided at its lower end with a foot member 106 connected to the arm by a closely wound spring 107 to impart some yieldability to the foot member. There is fixedly secured to the outer end of the shaft 99, an arm 108. This arm is connected to an arm 109 by a link 110. The arm 109 is fixed to the outer end of a shaft 111 journalled in a bracket 112 fixed to the opposite side wall of the housing below the lower end of the magazine 23. There is fixed to the opposite end of the shaft 111, an arm 113 depending from the shaft and carrying at its lower bifurcated end an inking roller 114. Normally, this structure is positioned, as shown in Figures 1 and 5.

Figure 3:
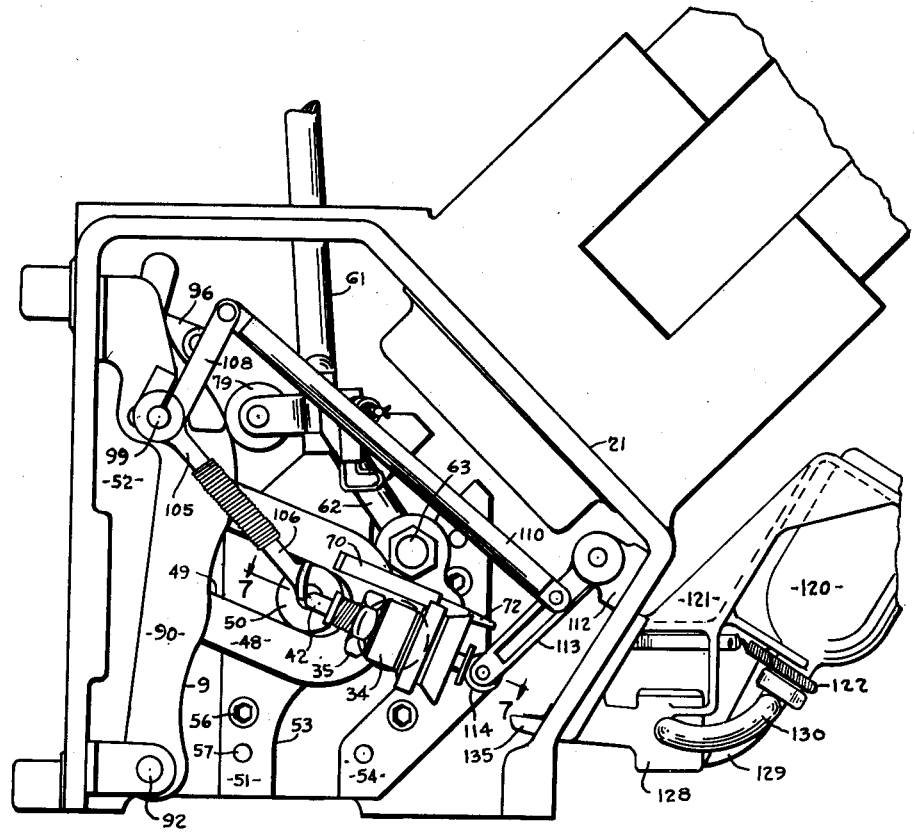
Figure 3 is a view, similar to Figure 1, showing the closure engaging member positioned approximately midway in its movement from the discharge point toward the supply of closures after having released a closure at the discharge point.
Figure 7:
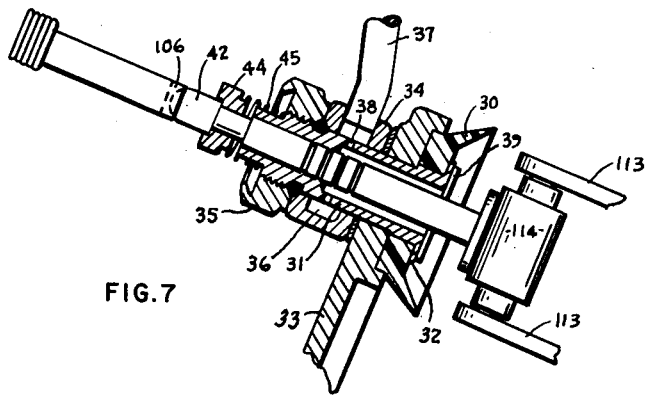
Figure 7 is a view taken on line 7—7, Figure 3.
Figure 8:
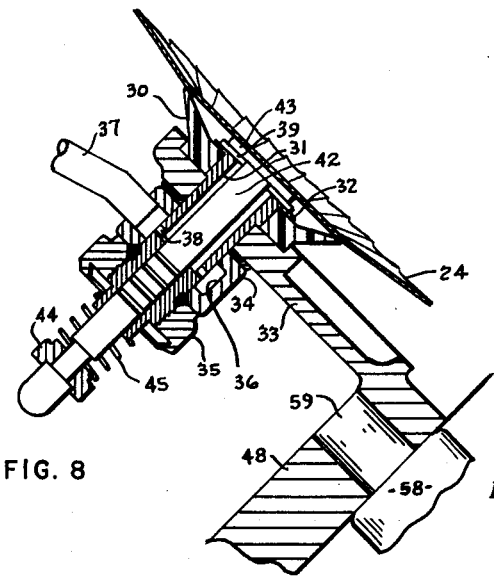
Figure 8 is a view taken on a line corresponding to line 8—8, Figure 5.

When the roller 79 effects movement of the lever 90 and rotation of the shaft 99, the arm 113, carrying the inking roll, is swung inwardly to the position shown in Figure 3 and simultaneously, the foot member 106 is moved to the right where it is engaged by the outer end of the stem 42 during the upward return movement of the transfer, as shown in Figures 3 and 7, thus effecting inward movement of the stem 42 to move the printing type 43 out of the suction cup 30 and into engagement with the inking roller 114 whereby, upon the upward return movement of the transfer, the type is coated with ink. The upper end of the lever 90 is formed with a portion 115 curved forwardly to move the roller 79 forwardly out of the plane of the cam edge 91 of the lever upon the upper limit of the movement of the transfer. The roller 79 remains in this position during the downward movement of the transfer and during the next upward movement of the transfer unless during the downward movement of the transfer the pin 71 is again moved behind the loop 83.

The purpose of this structure is to prevent an application of ink to the type 43 during each cycle of movement of the transfer, unless a closure is transferred with each downward movement of the cup 30. With the arrangement just described, the type is furnished with ink on the upward movement of the transfer only if, during the previous downward movement, a cap was transferred from the magazine 23. It will be understood, of course, in all cap applying machines there is a bottle detector, or cap-call, which functions to effect the transfer of a cap for each bottle entering the machine. In the event there is a bottle missing in the procession entering the machine, there is no cap removed from the magazine during the corresponding operation of the transfer.

In transfer structure of the type herein described, this bottle detector, or cap-call, functions to control the vacuum supplied to the suction cup 30—that is, in the event there is a bottle missing in the procession of bottles being fed through the machine, the cup 30 will not be connected to vacuum and no cap will be withdrawn from the magazine for application to the missing bottle. Occasionally, there are several bottles missing, or in one portion of the procession of bottles, whereby the closure transfer operates through several successive cycles without withdrawing a cap from the magazine. Also, when the capping machines are first started up, the machines and of course the closure transfer mechanisms are operated through several successive cycles before the first bottle reaches the machine. In both of these instances, if the ink furnishing roller 114 was fixedly mounted, as is conventional in printing devices, the type would receive an accumulation of ink which would result in blurred printing on a number of closures next transferred from the magazine. This means that no vacuum will be supplied to the conduit 37. In this event, the pin 71 will not be moved in position to engage the loop 83 and the member 76 will remain in the position shown in Figure 9 with the pin 71 positioned below the loop, see also Figure 2, so that upon the next upward movement of the member 48, the roll 79 will not engage the cam lever 90, whereby the inking roll 114 will not be swung inwardly for engagement by the type, nor will the type be pushed out of the suction cup by the foot member 106.

Ink is supplied to the roll 114 from a reservoir in the nature of a bottle 120 detachably mounted on a bracket 121, as by a spring 122. The bottle 120 is mounted in inverted position. The closure 125 of the bottle is pierced by a short tubular needle 126 and a similar longer needle 127 terminating in proximity to the bottom of the bottle. The needle 126 is connected near the bottom portion of an ink well 128 formed in the bracket 121 by a hose 129. The long needle 127 is connected to the upper portion of the well 128 by a hose 130. The needle 127 serves as a vent to maintain the desired level of ink in the well 128, as will be well understood. The well 128 is formed with a transversely extending passage 133 communicating with a felt or wick 134 positioned on an extension 135 of the bracket 121 and which extends inwardly through an aperture formed in the wall of the housing. Normally, the inking roll 114 is positioned in contact with the felt 134, as shown in Figures 1, 2 and 5, the wick 134 being continuously saturated with ink from the well 128.

With the structure described, each cap is printed with the desired indicia, the printing being effected by the outer or top surface of the closure being drawn against the face of the type 43 upon the application of vacuum to the cup 30, and without any contact with the inner surface of the closure. The printing type 43 can be quickly and conveniently changed by simply removing the U shaped washer 44 and withdrawing the type and the stem 42, and inserting another stem with a different type 43 thereon. The device prints distinctly and without any blurring due partially to the fact that the type is furnished with ink once only for each closure transfer.

What I claim is:

1. A bottle closure transfer for transferring closures successively from a supply to a discharge point comprising a closure engaging member, motion transmitting means operable to move said member over a predetermined path from said discharge point to a closure supply and thence, reversely over said path to said discharge point, said closure engaging member being operable upon engagement with a closure in said supply to withdraw the closure from the supply and to release the closure at said discharge point, a printing type carried by said closure engaging member for printing the closure while the same is engaged by said closure engaging member, and ink furnishing means operable to ink the surface of said type prior to engagement of said closure engaging member with a closure in said supply.

2. A bottle closure transfer for transferring closures successively from a supply to a discharge point comprising a closure engaging member, motion transmitting means operable to move said member over a predetermined path from said discharge point to a closure supply and thence reversely over said path to said discharge point, a printing type carried by said closure engaging member for printing the closure while the same is engaged by said closure engaging member, ink furnishing means mounted in juxtaposition to the path traveled by said closure engaging member, means operable to move said type outwardly from the closure engaging member during movement of the same toward the closure supply, and means operable to move said ink furnishing means in engagement with said printing type while the same is positioned outwardly from the closure engaging member.

3. A bottle closure transfer for transferring closures successively from a supply to a discharge point comprising a closure engaging member, motion transmitting means operable to move said member over a predetermined path from said discharge point to a closure supply and thence reversely over said path to said discharge point, a printing type carried by said closure engaging member for printing the closure while the same is engaged by said member, an ink well, means for maintaining an ink supply in said well, a felt arranged to be saturated by ink in said well, an ink furnishing roll normally arranged in contact with said felt, and means operable to move said roll into engagement with said type during movement of said closure engaging member toward said closure supply.

4. A bottle closure transfer for transferring closures successively from a supply to a discharge point and marking the closures during such transfer comprising a vacuum cup closure engaging member, motion transmitting means operable to move said vacuum cup over a predetermined path from said discharge point to the closure supply and thence reversely over said path to said discharge point, means operable to apply vacuum to said cup during movement thereof from said supply to said discharge point, and a closure marking member mounted in said vacuum cup and positioned therein for engagement by the closure upon application of vacuum to said cup.

References Cited in the file of this patent

UNITED STATES PATENTS

| | | |
|---|---|---|
| 1,039,797 | Pohjanen | Oct. 1, 1912 |
| 1,583,022 | Stanley et al. | May 4, 1926 |
| 2,060,616 | Fleischer et al. | Nov. 10, 1936 |
| 2,077,790 | Hakogi | Apr. 20, 1937 |
| 2,551,476 | Vantlander | May 1, 1951 |
| 2,654,311 | Costanzo | Oct. 6, 1953 |